Patented Oct. 1, 1929

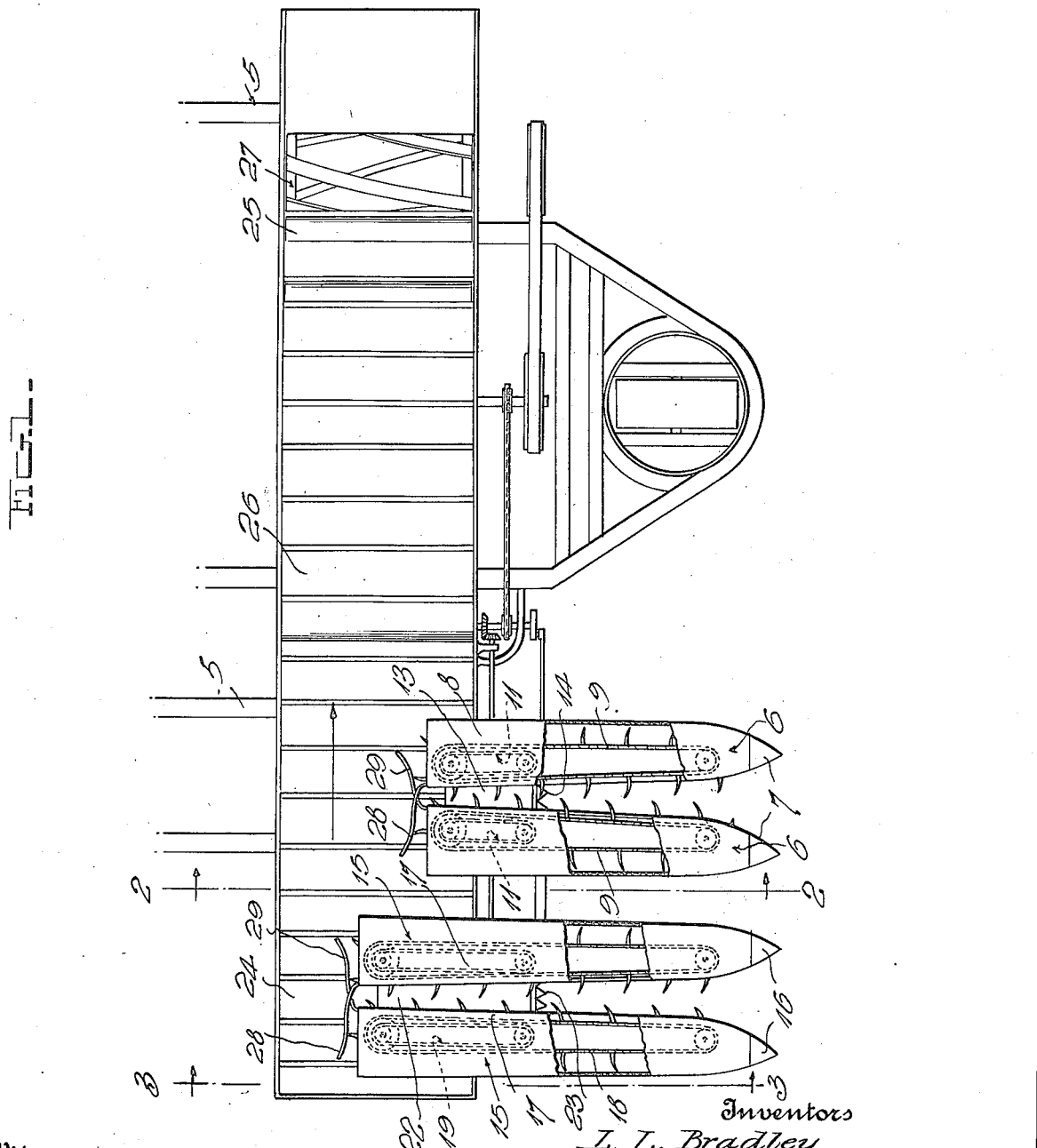

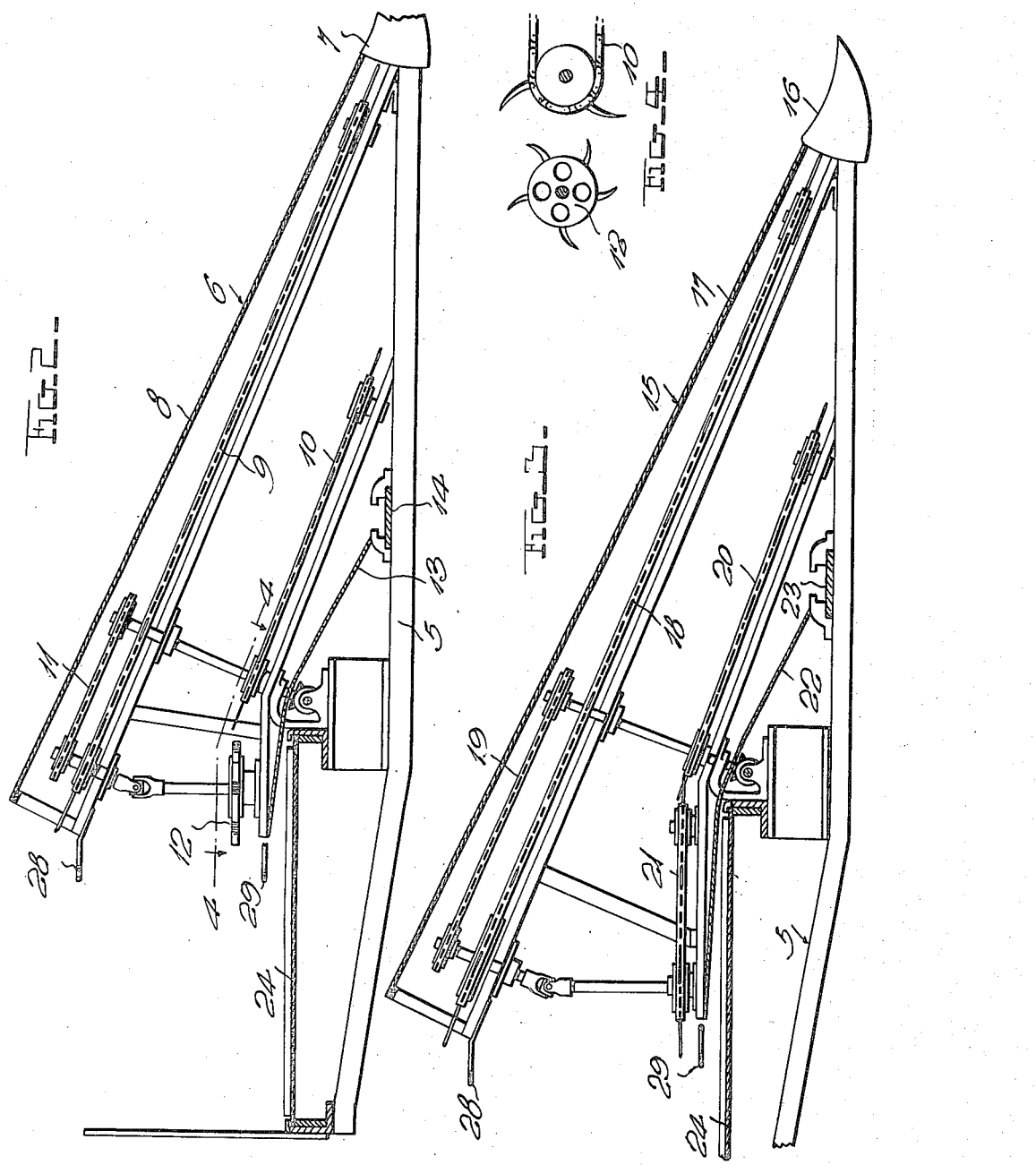

1,730,056

UNITED STATES PATENT OFFICE

LESLIE LEROY BRADLEY AND EUGENE MINER YOUNG, OF McLAUGHLIN, SOUTH DAKOTA

CORN HARVESTER

Application filed August 30, 1928. Serial No. 303,050.

The invention relates to a corn harvesting machine embodying rearwardly inclined conveying means for carrying cut stalks rearwardly in vertical positions, and a transverse conveyor to receive these stalks and carry them laterally, for instance, to ear-removing means and to stalk-shredding means. Much better results are obtainable if all of the stalks can be presented to the snapping rolls with their butt ends foremost, and it is one object of the present invention to provide unique stalk-turning means at the rear ends of the inclined conveying means for the purpose of turning the cut stalks from vertical to substantially horizontal positions and depositing them on the transverse conveyor with their butts all disposed in the direction in which said conveyor is traveling.

The present disclosure of the invention relates to a two-row harvester, inclined conveying means such as that above described, being provided for each row. It is a further object to so relate these two conveying means with each other, with the transverse conveyor and with the stalk-turning means, as to cause the stalks to be deposited in two rows upon said transverse conveyor. Thus, each row will have practically a negligible height and both may be readily presented to the snapping rolls, whereas if both inclined conveying means deposited the cut stalks in a single row upon the transverse conveyor, the mass would be too thick for advantageous presentation to the snapping rolls.

With the foregoing in view, the invention resides in the novel subject matter hereinafter described and claimed, description being accomplished by reference to the accompanying drawings.

Fig. 1 is a fragmentary top plan partly in horizontal section.

Figs. 2 and 3 are longitudinal sectional views on the correspondingly numbered lines of Fig. 1.

Fig. 4 is a detail horizontal section on line 4—4 of Fig. 2.

In the drawings above briefly described, the showing has been restricted so as to not confuse the gist of the invention, with other features of harvester construction. 5 denotes a portion of a suitable wheeled frame which may be of any desired construction and either towed across the field or propelled across the same.

Appropriately mounted on the frame 5, are two rearwardly inclined stalk-gatherers and conveyors 6 which preferably embody the usual front shoes 7, the guides 8, the chains 9—10—11, the final discharge wheel 12 behind the chain 10, and the rearwardly inclined cut-stalk support 13 behind the cutter 14.

Two additional stalk-gatherers and conveyors 15 are mounted on the frame 5 in outwardly spaced relation with the conveyors 6. These conveyors 15 also incline rearwardly and they project a considerable distance in rear of the conveyors 6, as seen in Fig. 1 and by a comparison of Figs. 2 and 3. Each conveyor 15 preferably embodies a front shoe 16, a guide 17, chains 18—19—20—21, and a stalk supporting plate 22 inclining rearwardly from the cutter 23. All movable parts of these conveyors, like corresponding parts of the conveyors 6, may be driven in any desired manner, for instance by operating connections from a bull wheel, or by similar connections from a motor upon the frame.

A transverse conveyor 24 is mounted upon the frame 5 and may be driven by any desired means in the direction of the arrow of Fig. 1. The conveyors 6 are positioned to deliver onto the front edge portion of this transverse conveyor 24 while the conveyors 15 deliver onto the rear edge of said conveyor 24. Thus, the stalks are spread out to better advantage upon the transverse conveyor, for effective presentation to ear-snapping means, one roll of which is indicated at 25. Over the portion of the conveyor 24 toward the snapping rolls 25, is an auxiliary conveyor 26 which co-acts with said conveyor 24 in properly presenting the stalks to the snapping rolls, said rolls and auxiliary conveyor being operable in any desired way. Beyond the snapping rolls, we have illustrated a stalk shredder 27 for shredding the stalks as they pass through the snapping rolls. We wish it understood however that as far as this particular application is concerned, the conveyor 26, the snapping rolls 25 and the shredder 27 do not form parts of the invention claimed, and hence these parts are not shown or described in detail. One feature of the invention has already been described, that is, the relation of the relatively short and long inclined conveyors 6—15, with the conveyor 24 so that conveyors 6 deliver onto the front portion of said conveyor 24, whereas the conveyors 15 deliver onto the rear portion of said conveyor 24. The other feature of novelty will now be described.

Fixedly mounted at the rear ends of the conveyors 6—15, are two pairs respectively of stalk-turning arms 28—29. The arms 29 are mounted at the rear ends of the outermost of the conveyors 6—15 only a slight distance above the transverse conveyor 24, and said arms are turned in the direction in which said conveyor 24 travels. The arms 28 are mounted at the rear ends of the innermost of the conveyors 6—15 and they are upwardly spaced a considerable distance from the conveyor 24. These arms 28 turn in the opposite direction from the arms 29. When the cut stalks whether short or long, are being rearwardly carried in vertical positions by the conveyors 6—15, said stalks are engaged with the arms 28—29 as they leave said conveyors. The result is that the arms 29 force the butt ends of the stalks laterally in the direction in which the conveyor 24 is traveling, while the arms 28 force the upper ends of the stalks laterally in the opposite direction. These stalks are thus turned from vertical positions to substantially horizontal positions and are laid upon the conveyor 24 with all of their butt ends facing the snapping rolls 25. It is thus insured that none of the stalks shall be presented to the snapping rolls with their tassel ends forward. Moreover, the use of the stalk-turning means such as 28—29 with the relatively short and long conveyors 6—15, insures ideal positioning of the stalks upon the conveyor 24, for proper engagement with any mechanism to which they are to be presented, for instance to an ear-snapping means, a stalk-shredding means or both.

Excellent results are obtainable from the general subject matter herein disclosed and it is therefore preferably followed. However, within the scope of the invention as claimed, numerous variations may be made and resort may be had to any desired mechanical features of construction for carrying the invention into effect.

We claim:—

1. In a corn harvester, two rearwardly inclined row-straddling conveyors for upwardly and rearwardly carrying cut stalks in vertical positions, a transverse conveyor to receive the stalks from said inclined conveyors, means at the rear end of one of said inclined conveyors for forcing the lower ends of the cut stalks in the direction of travel of said transverse conveyor, and means at the rear end of the other inclined conveyor for forcing the upper ends of the cut stalks in the direction opposite the travel of said transverse conveyor, thereby insuring that the butt ends of all stalks deposited upon said transverse conveyor shall be presented toward the delivery end thereof.

2. In a corn harvester, two rearwardly inclined row-straddling conveyors for upwardly and rearwardly carrying cut stalks in vertical positions, a transverse conveyor to receive the stalks from said inclined conveyors, and two curved stalk-turning arms mounted at the rear ends of said inclined conveyors, one of said arms being disposed slightly above the transverse conveyor and turned in the direction of travel of said transverse conveyor, the other of said arms being located further above said transverse conveyor and turned in the opposite direction, whereby said arms effect turning of the cut stalks from vertical to substantially horizontal positions with their butt ends facing in the direction in which said transverse conveyor travels.

3. In a corn harvester, a pair of rearwardly inclined row-straddling conveyors, a second pair of rearwardly-inclined row-straddling conveyors projecting rearwardly to a greater extent than the first named pair, both of said pairs of conveyors being adapted to carry cut stalks rearwardly in vertical positions, a transverse conveyor to receive the stalks from said inclined conveyors, and stalk-turning means at the rear ends of said inclined conveyors for turning the stalks from vertical to substantially horizontal positions and disposing them in two rows upon said transverse conveyor with their butt ends facing in the direction in which said transverse conveyor travels.

4. In a corn harvester, a pair of rearwardly inclined row-straddling conveyors, a second pair of rearwardly inclined row-straddling conveyors projecting rearwardly to a greater extent than the first named pair, both of said pairs of conveyors being adapted to carry cut stalks rearwardly in vertical positions, a transverse conveyor to receive the stalks from said inclined conveyors, and two pairs of curved stalk-turning arms mounted at the rear ends of said inclined conveyors respectively, one arm of each pair being disposed slightly above the transverse conveyor and turned in the direction of travel of said transverse conveyor, the other arm of each pair being located further above said transverse conveyor and turned in the opposite direction, whereby said arms turn the cut stalks from vertical substantially to horizontal positions and deposit them in two rows upon the transverse conveyor with their butt ends facing in the direction of travel of said transverse conveyor.

In testimony whereof we have hereunto affixed our signatures.

LESLIE LEROY BRADLEY.
EUGENE MINER YOUNG.